United States Patent
Byington et al.

(10) Patent No.: US 12,063,513 B2
(45) Date of Patent: Aug. 13, 2024

(54) SECURE TRUSTED SERVICE MANAGER PROVIDER

(71) Applicant: Apple Inc., Cupertino, CA (US)

(72) Inventors: Matthew C. Byington, Sunnyvale, CA (US); Christopher Sharp, San Jose, CA (US); Jeff W. Lin, San Jose, CA (US); Rahul Narayan Singh, Sunnyvale, CA (US); Sourabh Dugar, San Jose, CA (US); Yousuf H. Vaid, Fremont, CA (US)

(73) Assignee: Apple Inc., Cupertino, CA (US)

( * ) Notice: Subject to any disclaimer, the term of this patent is extended or adjusted under 35 U.S.C. 154(b) by 536 days.

(21) Appl. No.: 16/680,273

(22) Filed: Nov. 11, 2019

(65) Prior Publication Data
US 2020/0154270 A1 May 14, 2020

Related U.S. Application Data

(60) Provisional application No. 62/760,819, filed on Nov. 13, 2018.

(51) Int. Cl.
*G06Q 20/00* (2012.01)
*G06F 8/30* (2018.01)
(Continued)

(52) U.S. Cl.
CPC .............. *H04W 12/35* (2021.01); *G06F 8/30* (2013.01); *G06F 8/60* (2013.01); *G06Q 20/3226* (2013.01);
(Continued)

(58) Field of Classification Search
CPC .......... H04W 12/35; G06F 8/30; G06Q 20/00
See application file for complete search history.

(56) References Cited

U.S. PATENT DOCUMENTS

| 8,495,359 B2 * | 7/2013 | Etchegoyen .......... H04L 63/062 713/153 |
| 2013/0013931 A1 * | 1/2013 | O'Hare ................. H04L 9/3231 713/189 |

(Continued)

FOREIGN PATENT DOCUMENTS

| WO | WO2011123692 A2 * | 10/2011 | .......... G06F 11/1076 |
| WO | WO-2015023999 A1 * | 2/2015 | .......... G06Q 20/3226 |

OTHER PUBLICATIONS

A novel scheme for on-demand distribution of secure element keys (Year: 2013).*

(Continued)

*Primary Examiner* — Bruce I Ebersman
(74) *Attorney, Agent, or Firm* — BAKERHOSTETLER (57) ABSTRACT

A secure trusted service manager provider may include at least one processor configured to provide, to an electronic device, a first script to provision an applet instance corresponding to a third party server, the script including a public key corresponding to the third party server. The at least one processor may be configured to receive, from the electronic device, an encrypted symmetric key and provide the encrypted symmetric key to the third party server, the symmetric key being encrypted with the public key. The at least one processor may be configured to receive, from the third party server, an encrypted data element corresponding to a transaction to be performed by the applet instance, the encrypted data element being encrypted with the symmetric key, generate a second script that includes the encrypted data element and provide, to the electronic device, the second script that includes the encrypted data element.

20 Claims, 7 Drawing Sheets

(51) Int. Cl.
*G06F 8/60* (2018.01)
*G06Q 20/32* (2012.01)
*H04L 9/08* (2006.01)
*H04L 9/40* (2022.01)
*H04W 12/30* (2021.01)

(52) U.S. Cl.
CPC .......... *H04L 9/0822* (2013.01); *H04L 9/0825* (2013.01); *H04L 9/083* (2013.01); *H04L 63/0428* (2013.01); *H04L 9/0869* (2013.01); *H04L 2209/56* (2013.01)

(56) References Cited

U.S. PATENT DOCUMENTS

| | | | | |
|---|---|---|---|---|
| 2015/0019443 | A1* | 1/2015 | Sheets | G06Q 20/322 705/71 |
| 2015/0046339 | A1* | 2/2015 | Wong | G06Q 20/4016 705/44 |
| 2015/0088756 | A1* | 3/2015 | Makhotin | G06Q 20/401 705/71 |
| 2015/0271181 | A1* | 9/2015 | Mendel | H04L 63/10 726/4 |
| 2016/0267477 | A1* | 9/2016 | McDonald | G06Q 20/401 |
| 2017/0149740 | A1* | 5/2017 | Mansour | H04L 63/045 |
| 2017/0221055 | A1* | 8/2017 | Carlsson | G06Q 20/3821 |
| 2021/0295305 | A1* | 9/2021 | Sheets | G06Q 20/3829 |
| 2022/0051237 | A1* | 2/2022 | Karpenko | G06Q 20/401 |

OTHER PUBLICATIONS

A Review of Technical Approaches to Realizing Near-Field Communication Mobile Payments (Year: 2016).*

* cited by examiner

SECURE TRUSTED SERVICE MANAGER PROVIDER

CROSS REFERENCE TO RELATED APPLICATIONS

This application claims the benefit of priority to U.S. Provisional Patent Application No. 62/760,819 entitled "Secure Trusted Service Manager Provider," filed on Nov. 13, 2018, the disclosure of which is hereby incorporated herein in its entirety.

TECHNICAL FIELD

The present description relates generally to a secure trusted service manager (TSM) provider that generates and deploys scripts for third parties onto secure hardware components of devices, including script deployment of end-to-end encrypted third party data elements.

BACKGROUND

In a mobile payment system, a payment applet instance that is provisioned on a secure hardware component of an electronic device, such as a secure element, may correspond to a transaction credential ("credential") or card account, such as a credit card account. The payment applet typically is provisioned on the secure element by a script generated by a system owner. The payment applet may be used by the electronic device, after an authorized user authenticates with the mobile device (e.g., via fingerprint and/or password), to engage in a wireless payment transaction with, e.g., a wireless payment terminal. For example, after an authorized user authenticates with the electronic device, the electronic device may transmit, to the wireless payment terminal, a request for a wireless payment transaction using the card account corresponding to the payment applet instance.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

In a mobile payment system, in addition to the aforementioned payment applet instances that correspond to credit card accounts, one or more stored value payment applet instances that correspond to one or more respective stored value cards (or "truth on card" or "actual cash value" (ACV) cards), such as a transit card or other such prepaid card, may be provisioned on a secure hardware component of an electronic device. A stored value card may differ from, e.g., a credit card, in that monetary value is stored with the card itself, rather than being stored in an external account, e.g., maintained by a financial institution.

Since a representation of monetary value is stored directly with the card instance, such as in a secure element on an electronic device, modifications to the stored value card, including balance adjustment services and the like, cannot be performed directly between the mobile payment system server(s) and the third party server(s), such as the financial institution server(s). Rather, some types of modification to the stored value card must be performed with respect to the actual stored value payment applet instance, as stored on the secure hardware component of the electronic device. For example, the modification can be performed between the third party sever(s) (e.g., a service provider trusted service manager (SP TSM) server that generates a script for the modification) and the secure hardware component on the electronic device via the mobile payment system server(s) (e.g., a secure mobile platform (SMP) TSM), which are in direct communication with the secure hardware component, acting as a proxy for the third party server(s).

However, there may be a significant amount of technical complexity, overhead, and/or cost associated with generating a script that can be executed by a secure hardware component of an electronic device. The technical complexity may serve as a barrier to entry that prevents third party entities from providing users with services such as stored value payment applets, as the third party entities may lack the resources to generate scripts themselves. Furthermore, the third party entities may be reluctant to outsource the script generation to another entity as the outsourcing may require sharing information regarding financial transactions with the other entity (and/or sharing other private and/or sensitive user data).

In the subject system, one or more mobile payment system server(s) (e.g., a TSM server), are configured to operate as a service provider TSM server on behalf of third party entities to interface with applets of the third party entities that reside on secure hardware components of user devices. The mobile payment system TSM servers generate scripts around data elements provided by the third party servers, such as data elements corresponding to transactions to be performed by the applets.

In order to ensure the privacy/security of the data elements, an applet instance of a third party entity is provisioned onto the secure hardware component of an electronic device (by a mobile payment system TSM server, such as an SMP TSM server) with a public key corresponding to the third party entity. The applet generates a symmetric key (e.g., randomly), encrypts the symmetric key and, optionally, a nonce and provides the encrypted symmetric key and the nonce to a server of the third party entity via the mobile payment system TSM server. Since the symmetric key is encrypted using the public key corresponding to the third party entity, the mobile payment system servers are unable to access the symmetric key. The server of the third party entity decrypts the symmetric key and, optionally, the nonce, using its corresponding private key.

The third party entity may then use the symmetric key to encrypt one or more data elements, such as data elements corresponding to transactions to be performed by the third party's applet instance provisioned on the secure hardware component of the electronic device. For example, for a stored value payment applet instance, the data elements may pertain to funds to be added to, or removed from, the stored value payment applet instance. The third party entity may encrypt the data elements and the nonce (e.g., to avoid replay attacks) using the symmetric key and provides the encrypted data elements and the nonce to a mobile payment system TSM server (such as an SMP TSM server). A mobile payment system TSM server (such as a SP TSM server) wraps the encrypted data elements and the nonce into a script and a mobile payment system TSM server (such as an SMP TSM server) transmits the script to the secure hardware component of the electronic device.

The secure hardware component executes the script to provide the encrypted data element and nonce to the applet instance of the third party entity. The applet instance uses the symmetric key to decrypt the data element and nonce, and then performs a transaction based at least in part on the data element (e.g., assuming the received nonce matches the previously provided nonce). The results of the transaction may be encrypted by the applet instance using the symmetric key and provided back to the server of the third party entity via the SMP TSM server.

In this manner, the subject system allows third party entities to provide users with applet instances provisioned on secure hardware components of user devices, such as stored value payment applet instances, without requiring the technical complexity and overhead resources/cost associated with generating scripts that are executable by the secure hardware components, but while maintaining the security/privacy of the transaction data and/or user data included in the scripts.

Figure 1:
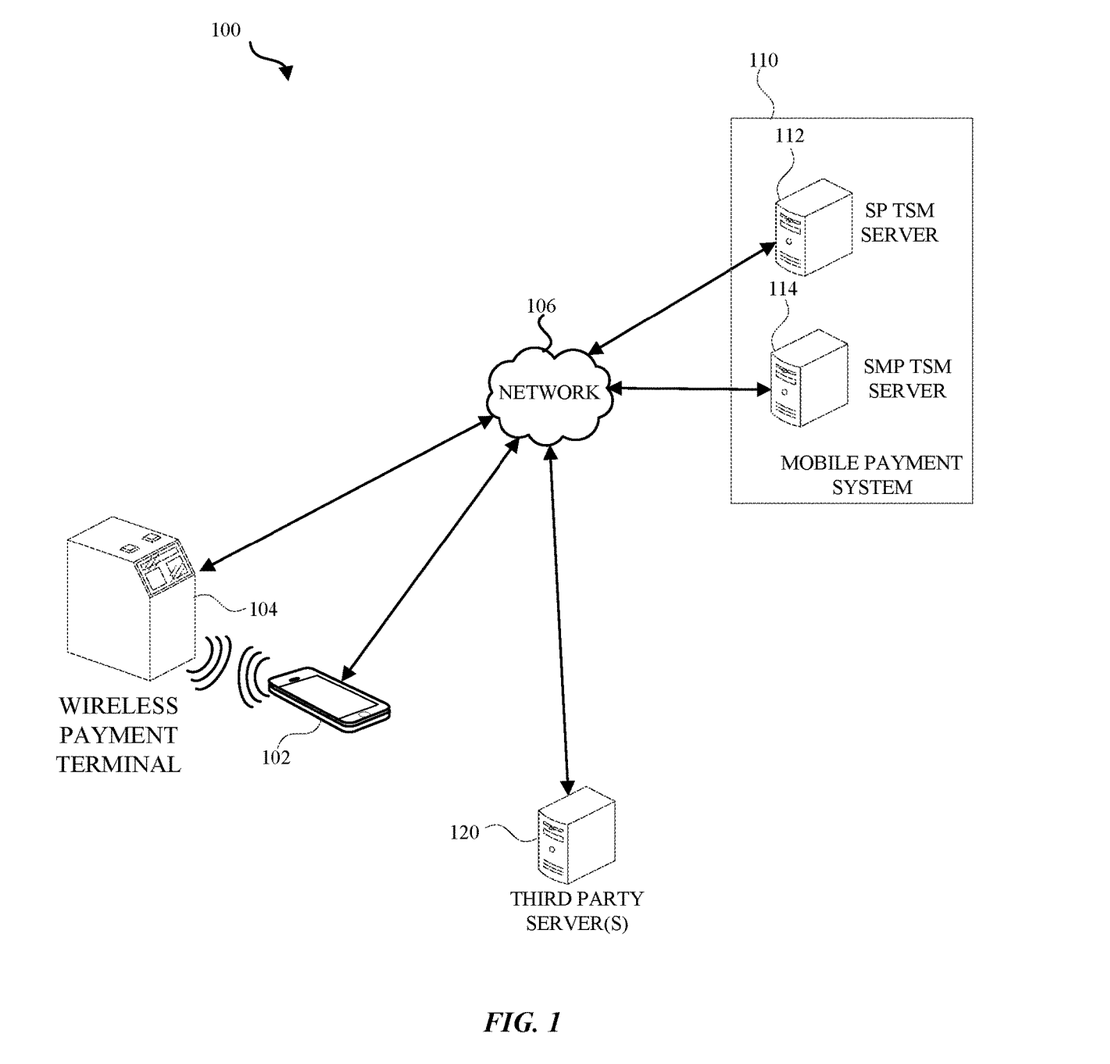
FIG. 1 illustrates an example network environment for a secure trusted service manager provider in accordance with one or more implementations.

FIG. 1 illustrates an example network environment 100 for a secure trusted service manager provider in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. Although the description is generally presented with respect to one or more stored value payment credentials (or applets), the techniques disclosed also may be implemented with respect to other types of payment credentials (or applets).

The network environment 100 includes an electronic device 102, a wireless payment terminal 104, a network 106, a mobile payment system 110, and one or more third party servers 120. In one or more implementations, the mobile payment system 110 may include an SP TSM server 112 that generates scripts to be transmitted/provisioned to the electronic device 102, and an SMP TSM server 114 that provisions/transmits the scripts to the electronic device 102. In one or more implementations, the functions of the SP TSM server 112 and the SMP TSM server 114 may be performed by a single TSM server instance/entity. Although the mobile payment system 110 is illustrated in FIG. 1 as the servers 112, 114, at least a portion of the mobile payment system 110 may also reside on the electronic device 102, such as in the form of a service.

The network 106 may communicatively (directly or indirectly) couple, for example, any two or more of the electronic device 102, the wireless payment terminal 104, the mobile payment system 110 and/or the one or more third party servers 120. In one or more implementations, the network 106 may be an interconnected network of devices that may include, or may be communicatively coupled to, the Internet. For explanatory purposes, the network environment 100 is illustrated in FIG. 1 as including a single electronic device 102 and a single third party server 120; however, the network environment 100 may include any number of electronic devices and third party servers.

The electronic device 102 may be, for example, a portable computing device such as a laptop computer, a smartphone, a peripheral device (e.g., a digital camera, headphones), a tablet device, a wearable device such as a watch, a band, and the like, or any other appropriate device that includes one or more wireless interfaces, such as near field communication (NFC) radios, WLAN radios, Bluetooth radios, Zigbee radios, cellular radios, and/or other wireless radios. In FIG. 1, by way of example, the electronic device 102 is depicted as a mobile device. The electronic device 102 may be, and/or may include all or part of, the electronic device discussed below with respect to FIGS. 2 and 3, and/or the electronic system discussed below with respect to FIG. 6. In one or more implementations, the electronic device 102 may include a secure element onto which applet instances, including stored value payment applet instances, may be provisioned. An example electronic device that includes a secure hardware component, such as a secure element and/or a secure enclave processor, is discussed further below with respect to FIG. 2, and an example secure hardware component is discussed further below with respect to FIG. 3.

The wireless payment terminal 104 may be, for example, a wireless transit payment terminal, a wireless toll payment terminal, a wireless parking meter payment terminal, a wireless point of sale payment terminal, and/or any device that includes one or more wireless interfaces that may be used to perform a wireless payment transaction, such as NFC radios, wireless local area network (WLAN) radios, Bluetooth radios, Zigbee radios, cellular radios, and/or other wireless radios. In FIG. 1, by way of example, the wireless payment terminal 104 is depicted as a wireless transit payment terminal. The wireless payment terminal 104 may be, and/or may include all or part of, the electronic system discussed below with respect to FIG. 6.

The electronic device 102 may communicate with the wireless payment terminal 104 via a direct communication, such as NFC that bypasses the network 106. In one or more implementations, the electronic device 102 may communicate with the wireless payment terminal 104 over the network 106 and/or the wireless payment terminal 104 may not be communicatively coupled to the network 106.

The mobile payment system 110 may include one or more servers that facilitate providing a mobile payment system to the electronic device 102. In one or more implementations, the mobile payment system 110 may be and/or may include a secure mobile platform. For example, the mobile payment system 110 may include one or more SMP TSM servers 114 that provision/transmit scripts to secure hardware components of electronic devices, such as the electronic device 102, one or more SP TSM servers 112 that generate scripts to be provisioned/transmitted to secure hardware components of electronic devices, one or more application servers, and/or generally any servers that may facilitate providing a mobile payment system.

In one or more implementations, an authorized user of the electronic device 102 may have a user account and/or a network account with the mobile payment system via the mobile payment system 110. The user account may be used to manage the various cards and/or credentials that the user has registered with the mobile payment system. The servers 112, 114 of the mobile payment system 110 may be, and/or may include all or part of, the electronic system discussed below with respect to FIG. 6.

The one or more third party servers 120 may include one or more servers that facilitate a service being provided, such as a transit service, and/or that may facilitate utilizing wireless payment transactions for the service being provided. In one or more implementations, the one or more third party servers 120 may include one or more servers corresponding to one or more financial institutions. The one or more third party servers 120 may include one or more broker servers, one or more application servers, or generally any servers that may facilitate providing a service and/or utilizing wireless payment transactions for the service.

In one or more implementations, an authorized user of the electronic device 102 may have a user account with one or more third party entities associated with the one or more third party servers 120. The user account may be used to, e.g., utilize a credential associated with the third party entity for wireless payment transactions via the electronic device 102. The one or more third party servers 120 may be, and/or may include all or part of, the electronic system discussed below with respect to FIG. 6. For explanatory purposes, the one or more third party servers 120 are generally described herein with reference to a single transit system. However, the one or more third party servers 120 may include one or more servers corresponding to multiple different services. For example, the one or more third party servers 120 may correspond to servers of multiple different transit systems, communications services, toll services, financial services, and/or other such services.

In one or more implementations, the one or more third party servers 120 may communicate with corresponding applet instances residing on a secure hardware component of the electronic device 102 via the mobile payment system 110 to facilitate managing the applet instances, such as stored value payment applet instances (and/or other payment applet instances) provisioned on the secure hardware component of the electronic device 102. For example, the one or more third party servers 120 may provide encrypted data elements to the mobile payment system 110, the SP TSM server 112 may generate a script that includes the encrypted data elements, and the SMP TSM server 114 may deploy the script to the secure hardware component of the electronic device 102 for modifying/updating one or more stored value payment applets, and/or for provisioning new stored value payment applets on the secure hardware component of the electronic device 102. In one or more implementations, the provisioning of new stored value payment applets onto the secure element of the electronic device 102 may be performed by the SMP TSM server 114 of the mobile payment system 110 on behalf of the one or more third party servers 120, and the provisioned applets may include a public key of the corresponding third party server 120.

Stored value payment applet instances may be provisioned on the secure hardware component with an applet identifier (AID) and/or one or more attributes, such as an attribute storing the amount of the monetary value associated with the stored value payment applet, and/or services associated with the stored value payment applet, such as a monthly transit pass, a transit pass for a number of rides, and the like. Once a stored value payment applet has been provisioned on the secure hardware component of the electronic device 102 for a given third party, the electronic device 102 may be used for a wireless transaction (e.g., with that third party), such as a wireless payment transaction with the wireless payment terminal 104, and/or for an electronic transaction over the network 106, such as over the Internet. When utilizing an NFC-based wireless payment transaction, the user may place their electronic device 102 on, or in close proximity to (e.g., within approximately 4-20 centimeters), the wireless payment terminal 104 to perform a wireless payment transaction with the wireless payment terminal 104.

In order to update, renew, or modify an attribute of an existing stored value payment applet provisioned on the secure hardware component of the electronic device 102, a user of the electronic device 102 may access a web site and/or an application ("app") corresponding to the associated third party, such as a web site and/or app provided by the one or more third party servers 120, and/or the user may interact with a physical device corresponding to the associated third party, such as a stored value card provisioning device, e.g., to request that monetary value and/or one or more services be added to and/or modified on the existing stored value payment applet instance. The user may provide a monetary payment to the third party, such as a cash payment to a physical machine and/or an electronic payment via the web site or app. The monetary payment may correspond to the monetary value the user would like added to the stored value payment applet and/or the monetary payment may correspond to the value of the services being added and/or renewed.

The one or more third party servers 120 cause the monetary value and/or services to be added to the existing stored value payment applet instance provisioned on the secure hardware component of the electronic device 102 by transmitting encrypted data elements (that reflect the monetary value and/or services to be added) to the mobile payment system 110. The SP TSM server 112 may generate a script around the encrypted data elements, and the script may be deployed to the secure hardware component of the electronic device 102 by the SMP TSM server 114. The script may include one or more commands, instructions, and/or code elements to be executed by the secure hardware component and, in one or more implementations, the script may be referred to as a personalization (or "perso") script.

After the transaction is completed (or incurs a time-out or otherwise fails), the secure hardware component on the electronic device 102 transmits the encrypted results of the transaction to the mobile payment system 110, such as to the SMP TSM server 114, and the encrypted results are forwarded by the mobile payment system 110 to the one or more third party servers 120. In this manner, the one or more third party servers 120 can be informed of the results of the transaction, e.g., when the transaction incurs a time-out or otherwise fails, without exposing the results of the transaction to the mobile payment system 110.

In one or more implementations, if the transaction resulted in an attribute of the stored value payment applet being modified, e.g., other than changing the stored monetary value attribute, such as renewing a service, adding a service, changing a service, etc., a mobile payment application on the electronic device 102 is instructed to refresh the displayed data to reflect the transaction. An example process flow for secure third party script generation and deployment through the mobile payment system 110 is discussed generally below with respect to FIG. 4, and is discussed in more detail below with respect to FIGS. 5A-B.

Figure 2:
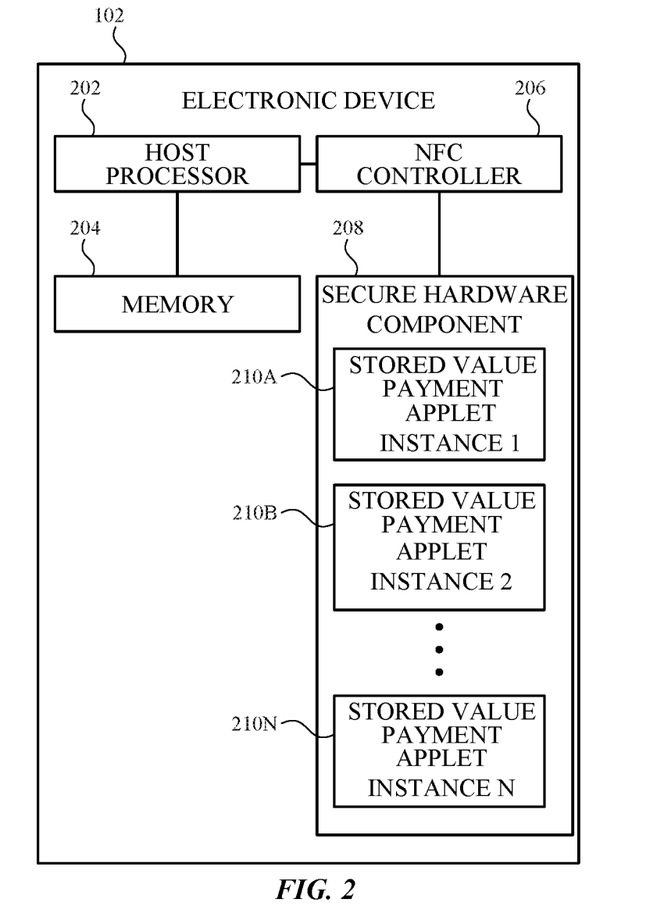
FIG. 2 illustrates an example electronic device in a system that utilizes a secure trusted service manager provider in accordance with one or more implementations.

FIG. 2 illustrates an example electronic device 102 in a system that utilizes a secure trusted service manager provider in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a host processor 202, a memory 204, an NFC controller 206, and a secure hardware component 208, which may be, for example, a secure element and/or a secure enclave processor. The secure hardware component 208 may include one or more interfaces for communicatively coupling to the NFC controller 206 and/or the host processor 202, such as via one or more single wire protocol (SWP) connections and/or any other data connection.

The secure hardware component 208 may include one or more provisioned stored value payment applet instances 210A-N and/or one or more provisioned payment applet instances, e.g., corresponding to one or more credit card accounts, and/or one or more other applet instances. In one or more implementations, the operating system and/or execution environment of the secure hardware component 208 may be a JAVA-based operating system and/or JAVA-based execution environment, and the one or more stored value payment applet instances 210A-N may be JAVA-based applets. In other implementations, other operating systems, languages, and/or environments can be implemented. In addition to the one or more stored value payment applet instances 210A-N, the secure hardware component 208 may also include one or more additional applets for performing other operations, such as a security applet, a registry applet, and the like.

The one or more stored value payment applet instances 210A-N may be provisioned on the secure hardware component 208 in part by, for example, the SMP TSM server 114. For example, the SMP TSM server 114 may transmit a provisioning script to the electronic device 102 via the network 106. The host processor 202 of the electronic device 102 may receive the script and may provide the script to the secure hardware component 208, such as via the NFC controller 206 and/or directly to the secure hardware component 208. The secure hardware component 208 may perform one or more security mechanisms to verify the received script, such as one or more security mechanisms inherent in a Global Platform framework, and may then execute the received script.

The execution of the script by the secure hardware component 208 may cause one or more of the stored value payment applet instances 210A-N to be provisioned on the secure hardware component 208. The one or more stored value payment applet instances 210A-N may each be provisioned with one or more of: an applet identifier, a device primary account number (DPAN) identifier, an identifier of the associated third party (or other service provider), a public key of the associated third party, and/or one or more attributes. In one or more implementations, a provisioned stored value payment applet instance (or other provisioned applet instances) may be referred to as a credential and/or a transaction credential.

The applet identifier associated with a given stored value payment applet instance 210A may be used by, for example, the host processor 202, the TSM servers 112, 114, and/or the third party servers 120, to uniquely identify the stored value payment applet instance 210A relative to the other stored value payment applet instances 210B-N provisioned on the secure hardware component 208, such as to perform one or more operations with respect to the given stored value payment applet instance 210A. In one or more implementations, the applet identifiers may be used by the host processor 202 to store associations between the one or more stored value payment applet instances 210A-N and the associated one or more third party servers 120.

The one or more attributes provisioned with the one or more stored value payment applet instances 210A-N may include, for example, an attribute that indicates the amount of the monetary value that is being locally stored in each applet instance, an attribute that describes one or more services associated with each applet instance, and the like. In one or more implementations, the one or more stored value payment applet instances 210A-N may also be provisioned with an attribute that indicates the type of communication protocol used by the applets to communicate with wireless payment terminal 104. The types of communication protocols may include, for example, an NFC-A protocol, an NFC-B protocol, an NFC-F protocol, a Bluetooth protocol, a Bluetooth low energy protocol, a Zigbee protocol, a Wi-Fi protocol, or generally any communication protocol.

The one or more attributes of the one or more stored value payment applet instances 210A-N may be modified by the execution of one or more scripts, such as one or more scripts received from the SMP TSM server 114. For example, the execution of one or more scripts by the secure hardware component 208 may cause a modification in the amount of monetary value indicated by an attribute of a stored value payment applet instance 210A, may cause an attribute describing a service to be added to a stored value payment applet instance 210A, and/or may cause a change in a service described by an attribute of a stored value payment applet instance 210A, such as causing a service renewal, causing a modification to a service, etc.

The one or more stored value payment applet instances 210A-N may correspond to the same third party and/or service provider, such as the same transit system, and/or may correspond to different third parties and/or service providers, such as different transit systems. In one or more implementations, one of stored value payment applet instances 210A-N associated with a given third party and/or service provider may be designated as a default stored value payment applet for the service provider. The default designation may be characterized by a state attribute associated with the stored value payment applet.

The NFC controller 206 may include one or more antennas and one or more transceivers for transmitting/receiving NFC communications. The NFC controller 206 may further include one or more interfaces, such as a single wire protocol interface, for coupling to the host processor 202 and/or the secure hardware component 208. The NFC controller 206 may be able to communicate via one or more different NFC communication protocols, such as NFC-A (or Type A), NFC-B (or Type B), and/or NFC-F (or Type F or FeliCA). The NFC-A protocol may be based on International Organization for Standardization (ISO)/International Electrotechnical Commission (IEC) 14443A and may use Miller bit coding with a 100 percent amplitude modulation. The NFC-B protocol may be based on ISO/IEC 14443B and may use variations of Manchester encoding along with a 10 percent modulation. The NFC-F protocol may be based on FeliCA JIS X6319-4 and may use a slightly different variation of Manchester coding than the NFC-B protocol.

The wireless payment terminal 104 of FIG. 1 may include similar wireless communication capabilities as the electronic device 102. For example, the wireless payment terminal 104 may include one or more antennas and/or transceivers for communicating with the electronic device 102 via one or more of an NFC-A protocol, an NFC-B protocol, an NFC-F protocol, a Bluetooth protocol, a Bluetooth low energy protocol, a Zigbee protocol, a Wi-Fi protocol, or generally any communication protocol. In one or more implementations, the wireless payment terminal 104 may include a wireless reader, such as an NFC reader.

For explanatory purposes, the electronic device 102 uses the NFC controller 206 to communicate with the wireless payment terminal 104. However, the electronic device 102 may use any wireless communication protocol to communicate with the wireless payment terminal 104, such as Bluetooth, Bluetooth low energy, Wi-Fi, Zigbee, millimeter wave (mmWave), or generally any wireless communication protocol.

The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. Additionally, the host processor 202 may enable implementation of an operating system or otherwise execute code to manage operations of the electronic device 102. The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, one or more of the host processor 202, the memory 204, the NFC controller 206, the secure hardware component 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
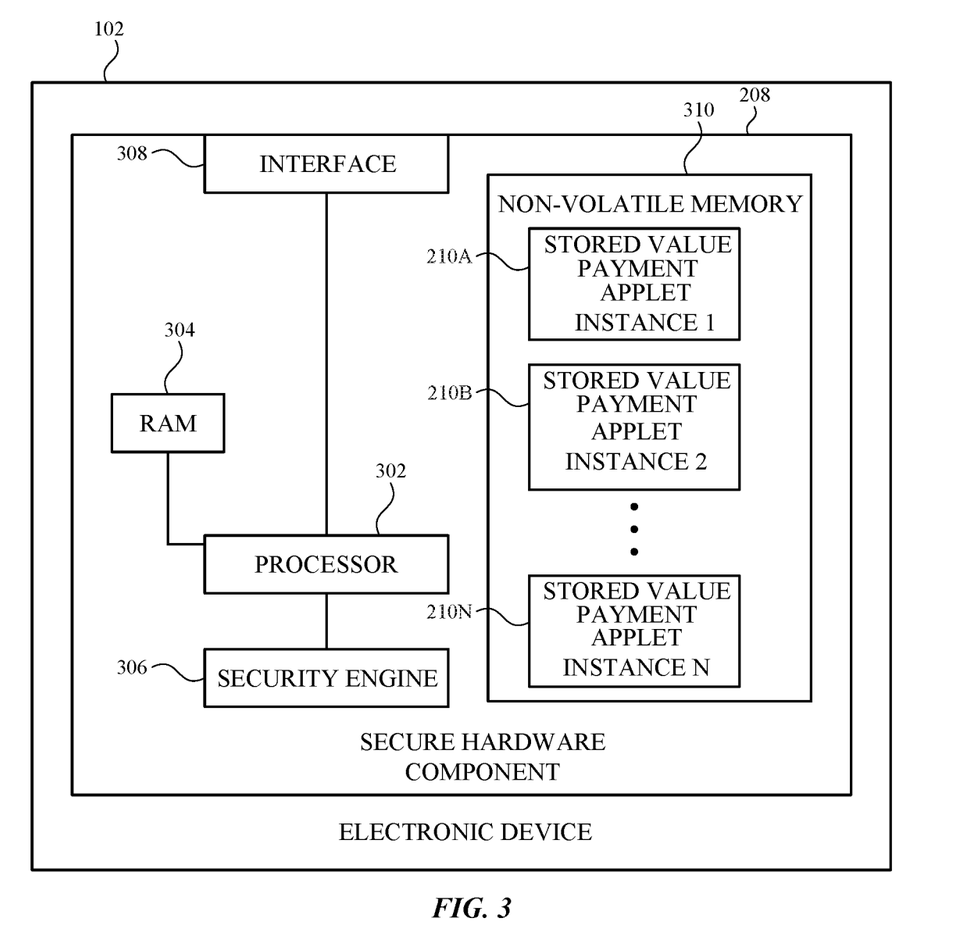
FIG. 3 illustrates an example electronic device including an example secure hardware component that may be used in a system that utilizes a secure trusted service manager provider in accordance with one or more implementations.

FIG. 3 illustrates an example electronic device 102 including an example secure hardware component 208 that may be used in a system that utilizes a secure trusted service manager provider in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The secure hardware component 208 of the electronic device 102 includes a secure processor 302, RANI 304, a security engine 306, an interface 308, and non-volatile memory 310. The RAM 304 may include one or more of static RAM (SRAM), and/or dynamic RAM (DRAM). The interface 308 may communicatively couple the secure hardware component 208 to one or more other chips in the electronic device 102, such as the NFC controller 206 and/or the host processor 202. The interface 308 may be, for example, a SWP interface, a universal serial bus (USB) interface, or generally any data interface. The secure processor 302 may be, for example, a reduced instruction set computing (RISC) processor, an advanced RISC machine (ARM) processor, or generally any processing circuitry.

The security engine 306 may perform one or more security operations for the secure hardware component 208. For example, the security engine 306 may perform cryptographic operations and/or may manage cryptographic keys and/or certificates. In one or more implementations, the communications between the secure hardware component 208 and an external device, such as the wireless payment terminal 104 and/or one or more of the TSM servers 112, 114 may be encrypted and/or may involve one or more other security mechanisms. For example, for NFC-F communications, an encryption key may be dynamically generated each time mutual authentication is performed. In these one or more implementations, the encryption/decryption and/or key generation/management may be performed all or in part by the security engine 306.

The non-volatile memory 310 may be and/or may include, for example, flash memory. The non-volatile memory 310 may store the attributes and executable code associated with the one or more stored value payment applet instances 210A-N. In one or more implementations, the non-volatile memory 310 may also store firmware and/or operating system executable code that is executed by the secure processor 302 to provide the execution environment for the one or more stored value payment applet instances 210A-N, such as a JAVA execution environment.

The one or more stored value payment applet instances 210A-N may include respective attributes such as one or more applet identifiers, one or more attributes indicative of a stored monetary value associated with the respective stored value payment applet instances 210A-N, and/or one or more attributes indicative of one or more services associated with the respective stored value payment applet instances 210A-N.

In one or more implementations, one or more of the secure processor 302, the RAM 304, the security engine 306, the interface 308, the non-volatile memory 310, and/or one or more portions thereof, may be implemented in software (e.g., subroutines and code), may be implemented in hardware (e.g., an ASIC, an FPGA, a PLD, a controller, a state machine, gated logic, discrete hardware components, or any other suitable devices) and/or a combination of both.

Figure 4:
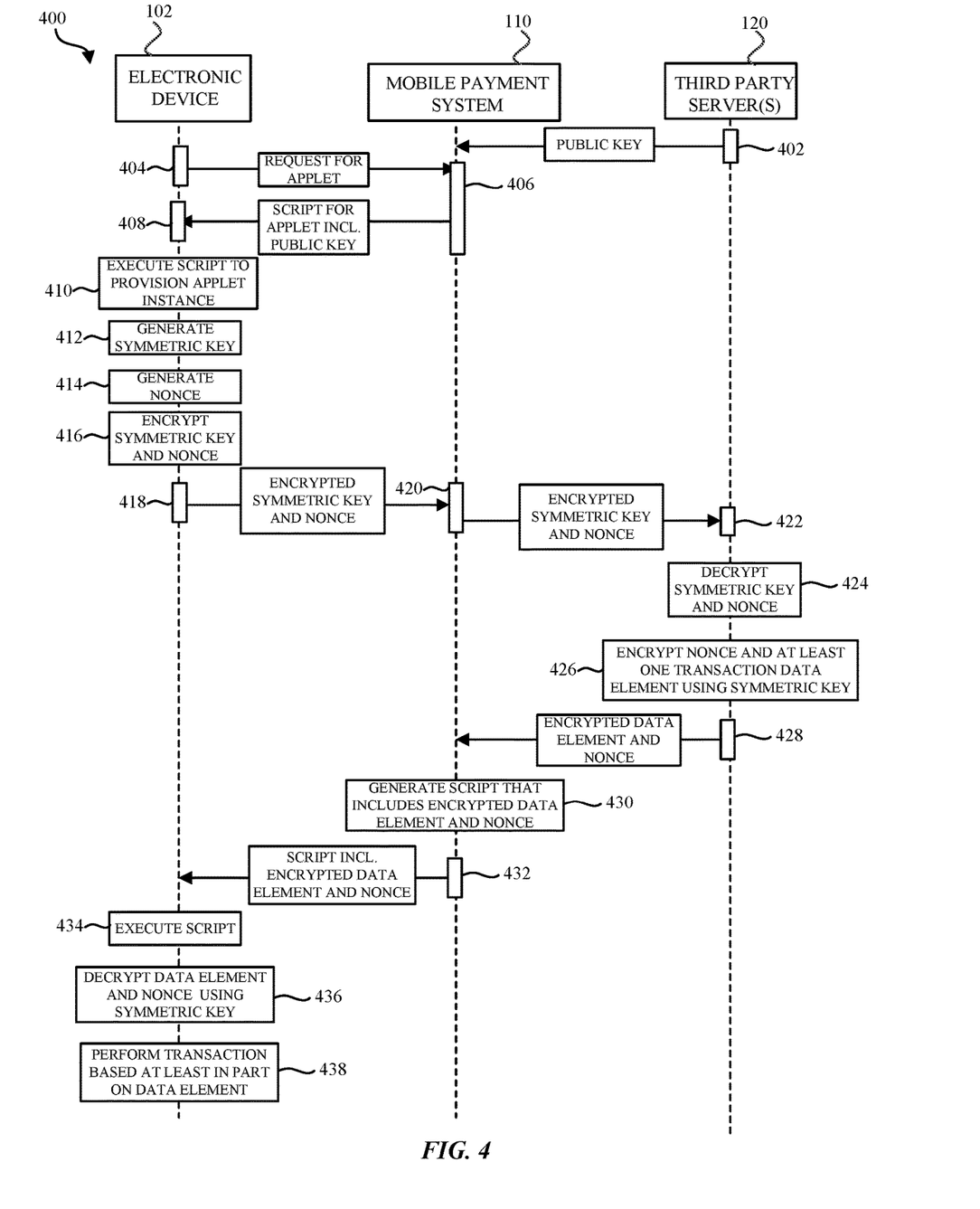
FIG. 4 illustrates an example overview process flow of a system that utilizes a secure trusted service manager provider in accordance with one or more implementations.

FIG. 4 illustrates an example overview process flow 400 of a system that utilizes a secure trusted service manager provider in accordance with one or more implementations. For explanatory purposes, the operations of the process flow 400 are described herein as occurring in serial, or linearly. However, multiple operations of the process flow 400 may occur in parallel. In addition, the operations of the process flow 400 need not be performed in the order shown and/or one or more operations of the process flow 400 need not be performed.

The process flow 400 may include the electronic device 102, the mobile payment system 110, and/or the third party server 120. The process flow 400 may be initiated when, for example, a third party server 120 provides a public key of the third party server 120 to the mobile payment system 110 (402), such as for provisioning an applet corresponding to the third party server 120 on electronic devices.

Asynchronously (and/or synchronously), a user of the electronic device 102 may request to have an applet, such as a stored value payment applet, corresponding to a given third party, provisioned on the secure hardware component 208 of the electronic device 102 with a particular attribute, such as an amount of monetary value. For example, the user may interact with a mobile payment application on the electronic device 102, and/or a third party application on the electronic device 102, to generate the request to provision the stored value payment applet on the electronic device 102 with a given amount of monetary value (or other value). In one or more implementations, the request may pertain to any transaction to be performed on a provisioned applet instance, such as a modification, addition, and/or renewal. The request is transmitted to the mobile payment system 110 (404).

The mobile payment system 110 receives the request and the mobile payment system 110 (e.g., the SMP TSM server 114) transmits a script to the electronic device 102 for provisioning an applet instance of the third party's applet on the secure hardware component 208 of the electronic device 102 (406). The electronic device 102 receives the script, and provides the script to the secure hardware component 208 of the electronic device 102 (408). The secure hardware component 208 of the electronic device 102 executes the script to provision the applet instance on the secure hardware component 208 (including the public key of the third party server 120) (410). The applet instance executing on the secure hardware component 208 of the electronic device 102 generates a symmetric key, such as randomly (412). In one or more implementations, the applet instance may also generate a nonce, such as randomly (414).

The applet instance encrypts the symmetric key and the nonce using the public key of the third party server 120 (416), and the secure hardware component 208 of the electronic device 102 transmits the encrypted script and nonce to the mobile payment system 110, such as to the SMP TSM server 114 (418). The mobile payment system 110 receives the encrypted symmetric key and nonce (420), but is unable to access either since they are encrypted using the public key of the third party server 120. The mobile payment system 110 forwards the encrypted symmetric key and nonce to the third party server 120 (420).

The third party server 120 receives the encrypted symmetric key and nonce (422) and decrypts the symmetric key and, optionally, nonce using the private key that corresponds to the public key that was provisioned onto the secure hardware component 208 with the applet instance (424). In one or more implementations, the nonce may not be encrypted. The third party server 120 generates transaction data to perform the transaction requested by the user, such as provisioning the applet instance with a given amount of monetary value and encrypts at least one transaction data element and the nonce using the symmetric key (426). In one or more implementations, the transaction data element may not be in the form of a script that is executable by the secure hardware component 208 of the electronic device, but may be the numerical value of the monetary amount being added to (or removed from) the applet instance. The third party server 120 transmits the encrypted data element and nonce to the mobile payment system 110 (428).

The mobile payment system 110, such as the SP TSM server 112, generates a script around the encrypted data element and nonce (430). In one or more implementations, the nonce may not be encrypted. The script may be executable by the secure hardware component 208 to provide the encrypted data element and nonce to the provisioned applet instance. The mobile payment system 110, such as the SMP TSM server 114, deploys the script to the electronic device 102 (432). The electronic device 102 receives the script and provides the script to the secure hardware component 208. The secure hardware component 208 executes the script (434) to provide the encrypted data element and nonce to the applet instance of the third party server 120. The applet instance decrypts the data element and nonce using the symmetric key (436) and performs the transaction based at least in part on the decrypted data element (e.g., when the decrypted nonce matches the previously generated nonce (414)) (438). For example, the applet instance may increase or decrease the amount of funds stored on the applet instance based on the value of the data element.

In one or more implementations, the applet instance may encrypt the results of the transaction using the symmetric key and may provide the encrypted results to the third party server 120 via the mobile payment system 110 in a similar manner as the request is provided to the third party server 120.

Figure 5A:
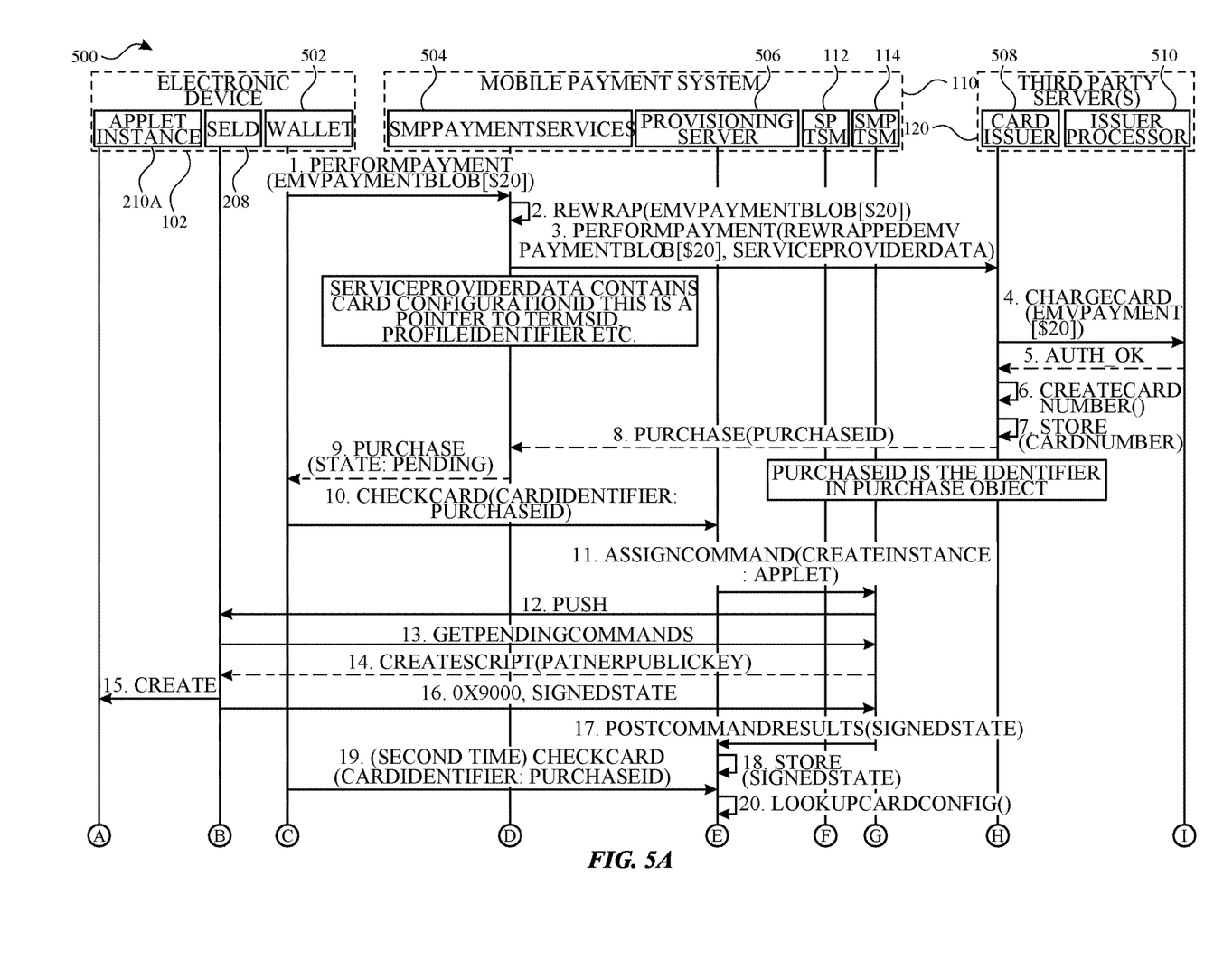
FIGS. 5A-B illustrate an example detailed process flow of a system that utilizes a secure trusted service manager provider in accordance with one or more implementations.
Figure 5B:
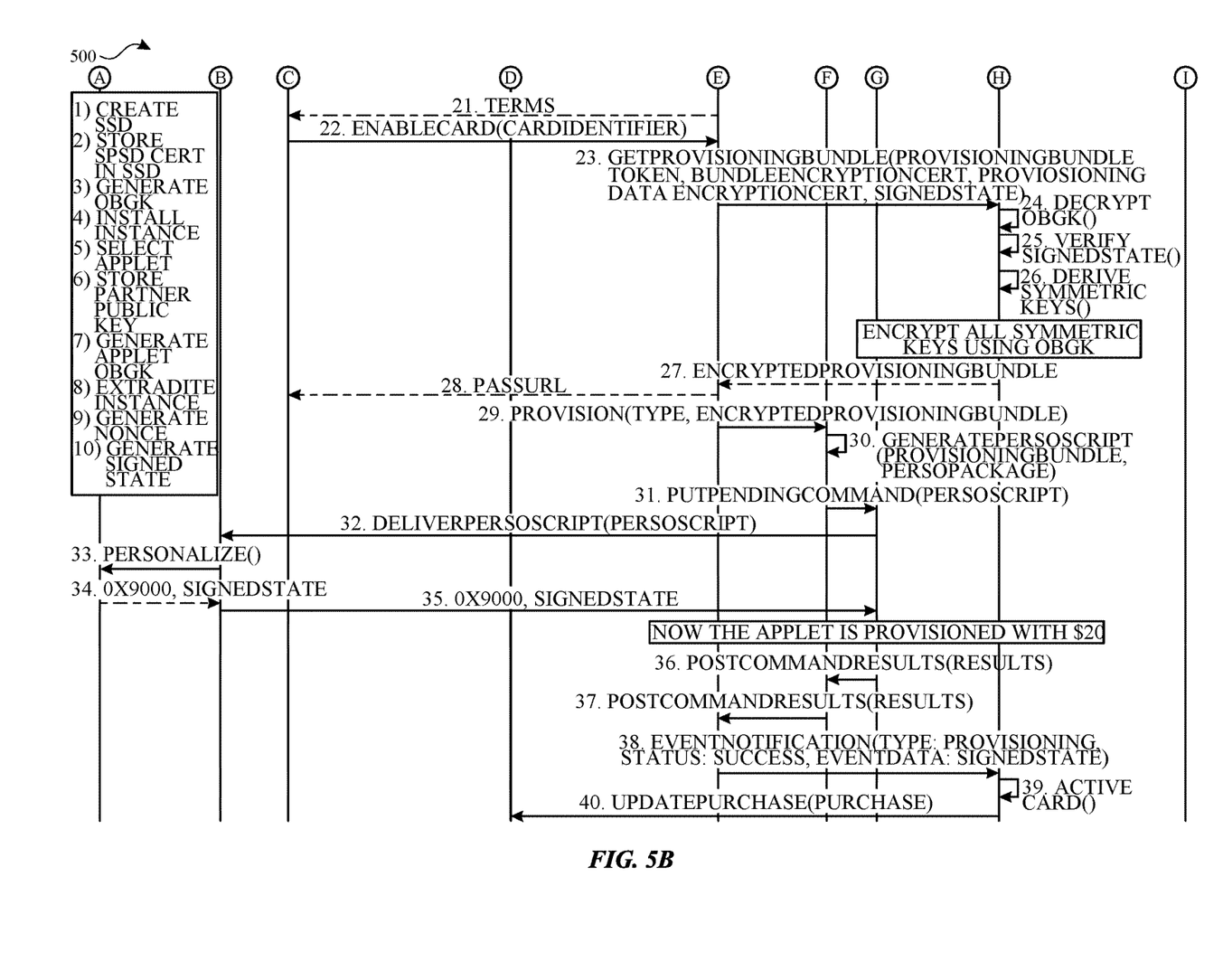

FIGS. 5A-B illustrate an example detailed process flow 500 of a system that utilizes a secure trusted service manager provider in accordance with one or more implementations. For explanatory purposes, the operations of the process flow 500 are described herein as occurring in serial, or linearly. However, multiple operations of the process flow 500 may occur in parallel. In addition, the operations of the process flow 500 need not be performed in the order shown and/or one or more operations of the process flow 500 need not be performed.

The process flow 500 includes the electronic device 102, the mobile payment system 110, and the third party server(s) 120. The electronic device 102 may include an applet instance 210A, a secure hardware component 208 (SELD), and a wallet 502 (or mobile payment application). The mobile payment system 110 may include an SMP payment service 504 (which may be a server-side service and/or may be a service executing on the electronic device 102), a provisioning server 506, an SP TSM server 112, and a SMP TSM server 114. The third party server(s) 120 may include a card issuer server 508 and an issuer processor server 510.

The process flow 500 begins when the wallet 502 transmits a payment request to provision a stored value payment applet for a given third party (or service provider) with a given monetary amount, e.g., for $20, to the SMP payment service 504. The SMP payment service 504 rewraps the request and transmits the request to the card issuer server 508 corresponding to the given third party. The card issuer server 508 requests that the issuer processor server 510 charge the form of payment provided for the request for the given monetary amount. The card issuer server 508 then transmits a purchase confirmation with a purchase identifier (ID) to the SMP payment service 504. The SMP payment service 504 transmits a purchase pending message to the wallet 502, and the wallet 502 transmits a check card request to the provisioning server 506 with the card identifier and purchase ID.

The provisioning server 506 transmits, to the SMP TSM server 114, a request to provision an applet instance corresponding to the third party on the secure hardware component 208 of the electronic device 102. The SMP TSM server 114 notifies the secure hardware component 208 that the applet instance is ready to be provisioned, and the secure hardware component 208 transmits a request, to the SMP TSM server 114, to receive the script for provisioning the applet instance. The SMP TSM server 114 transmits the applet instance provisioning script to the secure hardware component 208 of the electronic device 102.

The secure hardware component 208 executes the script to provision the applet instance 210A with the public key corresponding to the third party server 120, which may include creating an SSD, storing an SPSD certificate in the SSD, generating an OBGK, installing the applet instance, selecting the applet, storing the public key, generating an applet OBGK, extraditing the instance, generating a nonce, and generating a signed state, which may refer to generating a symmetric key and encrypting the symmetric key with the public key of the third party server 120.

The secure hardware component 208 may transmit the signed state to the SMP TSM server 114. The SMP TSM server 114 may forward the signed state to the provisioning server 506. The provisioning server 506 may store the signed state and subsequently receive a second check card request from the wallet 502. The provisioning server 506 may look up the card configuration and may provide the terms for the card to the wallet 502. The wallet may (e.g., when the terms are accepted by the user), transmit a request to enable the card (e.g., corresponding to the applet instance 210A) to the provisioning server 506.

The provisioning server 506 may transmit a request for a provisioning bundle to the card issuer server 508, where the request may include the signed state. The provisioning bundle may include a provisioning bundle token, a provisioning bundle certificate, and/or a provisioning data encryption certificate. The card issuer server 508 decrypts the OBGK, verifies the signed state, and derives the symmetric key(s). The card issuer server 508 may encrypt the symmetric key(s) using the OBGK. The card issuer server 508 may encrypt one or more data elements for performing the transaction by the applet instance 210A using the symmetric key(s), generates a provisioning bundle that includes the encrypted data elements, and transmits the encrypted provisioning bundle to the provisioning server 506.

The provisioning server 506 transmits a request to provision the provisioning bundle to the SP TSM server 112. The SP TSM server 112 generates a script around the encrypted provisioning bundle, and transmits the script to the SMP TSM server 114. The SMP TSM server 114 delivers the script to the secure hardware component 208 of the electronic device 102. The secure hardware component 208 executes the script to provide the encrypted provisioning bundle to the applet instance 210A.

The applet instance 210A decrypts the provisioning bundle using the symmetric key, performs the transaction, encrypts the results of the transaction and generates another signed state that includes the encrypted results of the transaction. In one or more implementations, at least a portion of the results may not be encrypted (e.g., success, fail, etc.). The signed state is transmitted to the SMP TSM server 114, which confirms that the applet instance 210A has been provisioned with the requested monetary amount, e.g., $20. The SMP TSM server 114 forwards the results to the SP TSM server 112, which forwards the results to the provisioning server 506. The provisioning server transmits a notification of the results to the card issuer server 508, which updates the SMP payment service 504 with the results.

Figure 6:
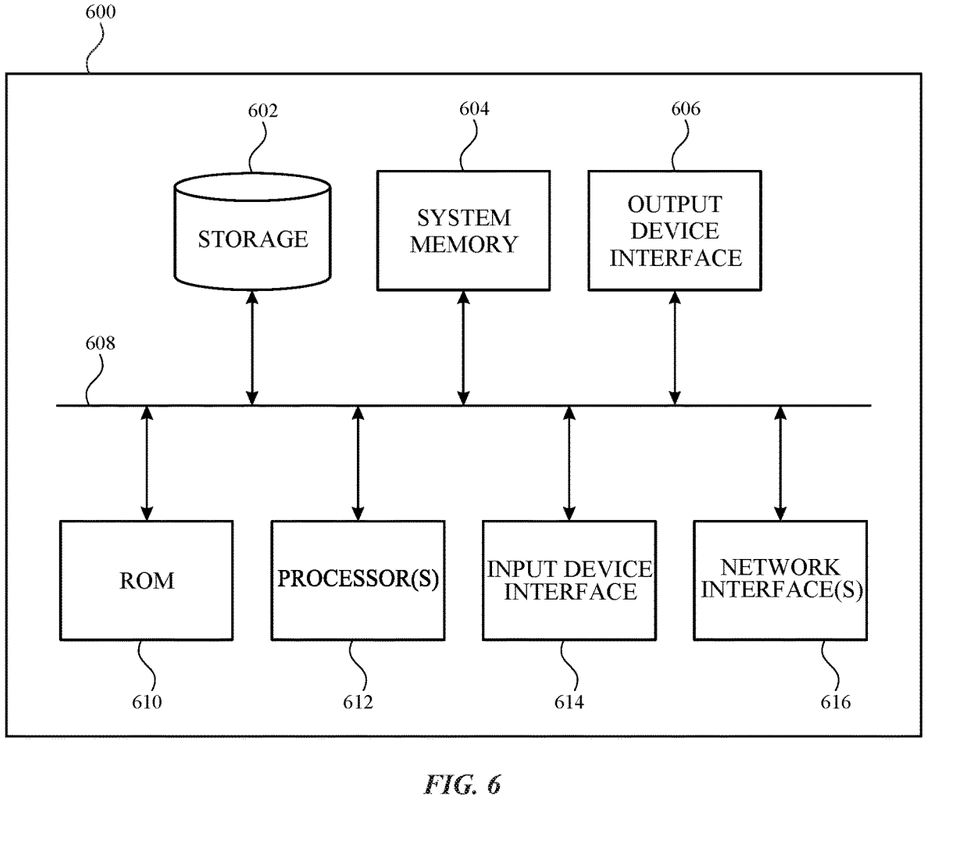
FIG. 6 conceptually illustrates an example electronic system with which aspects of the subject technology may be implemented in accordance with one or more implementations.

FIG. 6 conceptually illustrates an electronic system 600 with which one or more implementations of the subject technology may be implemented. The electronic system 600 can be, and/or can be a part of, the electronic device 102, and/or one or more of the servers 112, 114, 120 shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes, such as the electronic device 102 shown in FIG. 1, through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

As described above, one aspect of the present technology is the gathering and use of data available from specific and legitimate sources to improve provisioning applets on users' devices. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to provision applets in accordance with a user's preferences. Accordingly, use of such personal information data enables users to have greater control of the provisioned applets. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of provisioning applets, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, applets can be selected and provisioned to users' devices based on aggregated non-personal information data or a bare minimum amount of personal information, such as the content being handled only on the user's device or other non-personal information available to the applet provisioning services.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   providing, by one or more mobile payment system servers and to a secure hardware component of an electronic device, a first script to provision an applet instance corresponding to a third party server, the first script comprising a public key corresponding to a private key of the third party server, the third party server corresponding to a third party entity that is distinct from the one or more mobile payment system servers, and the first script comprising instructions that are executable by the secure hardware component to provision the applet instance;
   receiving, from the electronic device, an encrypted symmetric key and providing the encrypted symmetric key to the third party server, the symmetric key being encrypted with the public key of the third party server;
   receiving, by the one or more mobile payment system servers and from the third party server, at least one encrypted data element corresponding to a transaction to be performed by the applet instance, the at least one encrypted data element being encrypted with the symmetric key;
   generating, by the one or more mobile payment system servers, a second script configured for execution by the secure hardware component of the electronic device, the second script comprising the at least one encrypted data element; and
   providing, by the one or more mobile payment system servers and to the secure hardware component of the electronic device, the second script that comprises the at least one encrypted data element, wherein the second script is executable by the secure hardware component and the at least one encrypted data element is decryptable by the applet instance using the symmetric key to perform the transaction.

2. The method of claim 1, further comprising:
   receiving, from the third party server and prior to providing the first script to the electronic device, the public key corresponding to the third party server.

3. The method of claim 1, wherein the applet instance corresponds to a stored value payment applet instance and the transaction comprises adding or removing funds from the stored value payment applet instance.

4. The method of claim 3, wherein the first script is provided to the secure hardware component of the electronic device by the secure mobile platform trusted service manager server and the second script is generated by the server provider trusted service manager server and provided to the secure hardware component of the electronic device by the secure mobile platform trusted service manager server.

5. The method of claim 1, wherein the one or more mobile payment system servers comprise a secure mobile platform trusted service manager server and a service provider trusted service manager server.

6. The method of claim 1, wherein the secure hardware component comprises at least one of a secure element or secure enclave processor.

7. The method of claim 1, wherein the third party server decrypts the symmetric key using the private key.

8. The method of claim 1, wherein the received encrypted symmetric key further comprises an encrypted nonce, and the at least one encrypted data element further comprises the nonce.

9. The method of claim 1, wherein the symmetric key is randomly generated by the electronic device.

10. A device comprising:
    a host processor; and
    at least one secure hardware component configured to:
       receive, from one or more mobile payment system servers, a first script comprising instructions that are executable by the at least one secure hardware component to provision an applet instance corresponding to a third party server, the first script comprising a public key of the third party server, the third party server being distinct from the one or more mobile payment system servers;
       execute the instructions of the first script to provision the applet instance;
       generate a symmetric key for the applet instance;
       encrypt the symmetric key using the public key of the third party server;
       transmit the encrypted symmetric key to the one or more mobile payment system servers;
       receive, from the one or more mobile payment system servers, a second script that is executable by the at least one secure hardware component to perform a transaction corresponding to the applet instance, the second script having been generated by the one or more mobile payment system servers and comprising at least one encrypted data element from the third party server, the at least one encrypted data element being encrypted with the symmetric key;
       execute the second script to provide the at least one encrypted data element to the applet instance;
       decrypt the at least one encrypted data element using the symmetric key; and
       perform the transaction based at least in part on the at least one decrypted data element.

11. The device of claim 10, wherein the symmetric key is generated and encrypted by the applet instance, the at least one encrypted data element is decrypted by the applet instance, and the transaction is performed based at least in part on the at least one decrypted data element by the applet instance.

12. The device of claim 10, wherein the one or more mobile payment system servers includes a trusted service manager server and excludes the third party server.

13. The device of claim 12, wherein the second script is generated by the trusted service manager server.

14. The device of claim 10, wherein the secure hardware component comprises at least one of a secure element or secure enclave processor.

15. The device of claim 12, wherein the at least one secure hardware component is further configured to:
generate a nonce;
encrypt the nonce using the public key of the third party server; and
transmit the encrypted nonce with the encrypted symmetric key to the trusted service manager server, wherein the at least one encrypted data element of the second script comprises the nonce.

16. The device of claim 10, wherein the at least one secure hardware component is further configured to:
randomly generate the symmetric key for the applet instance.

17. A non-transitory machine-readable medium comprising code that, when executed by at least one processor, causes the at least one processor to perform operations, the code comprising:
code to provide, by a third party server and to a trusted service manager server, a public key for providing to a secure hardware component of an electronic device as part of a first script comprising instructions that are executable by the secure hardware component to provision an applet instance corresponding to the third party server;
code to receive, from the trusted service manager server, an encrypted symmetric key generated by the applet instance on the secure hardware component of the electronic device;
code to decrypt the encrypted symmetric key using a private key corresponding to the public key;
code to encrypt, using the symmetric key, at least one data element corresponding to a transaction to be performed by the applet instance on the secure hardware component of the electronic device; and
code to transmit the encrypted at least one data element to the trusted service manager server for providing to the secure hardware component of the electronic device as part of second script that comprises instructions that are executable by the secure hardware component, wherein the encrypted at least one data element is decryptable by the applet instance using the symmetric key to perform the transaction.

18. The non-transitory machine-readable medium of claim 17, wherein the secure hardware component comprises at least one of a secure element or secure enclave processor.

19. The non-transitory machine-readable medium of claim 17, wherein the applet instance corresponds to a stored value payment applet instance and the transaction comprises adding or removing funds from the stored value payment applet instance.

20. The non-transitory machine-readable medium of claim 17, wherein the trusted service manager server is part of one or more mobile payment system servers that excludes the third party server.

\* \* \* \* \*